(12) United States Patent
Kobayashi

(10) Patent No.: US 6,842,172 B2
(45) Date of Patent: Jan. 11, 2005

(54) IMAGE PROCESSOR AND IMAGE PROCESSING METHOD, AND RECORDED MEDIUM

(75) Inventor: Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 10/018,033

(22) PCT Filed: Apr. 13, 2001

(86) PCT No.: PCT/JP01/03202

§ 371 (c)(1),
(2), (4) Date: May 15, 2002

(87) PCT Pub. No.: WO01/80187

PCT Pub. Date: Oct. 25, 2001

(65) Prior Publication Data

US 2002/0150287 A1 Oct. 17, 2002

(30) Foreign Application Priority Data

Apr. 13, 2000 (JP) .................................. 2000-112072
Apr. 13, 2000 (JP) .................................. 2000-112074
Mar. 19, 2001 (JP) .................................. 2001-77564

(51) Int. Cl.$^7$ ............................................ G06T 15/00
(52) U.S. Cl. .................................... 345/419; 345/629
(58) Field of Search ................................ 345/419, 426, 345/630, 629, 641; 382/100

(56) References Cited

U.S. PATENT DOCUMENTS

| | | | | |
|---|---|---|---|---|
| 4,823,285 A | * | 4/1989 | Blancato ..................... | 345/630 |
| 5,060,171 A | * | 10/1991 | Steir et al. .................. | 345/630 |
| 5,267,154 A | | 11/1993 | Takeuchi et al. ............ | 345/419 |
| 5,404,426 A | | 4/1995 | Usami et al. ................ | 345/120 |
| 5,777,619 A | * | 7/1998 | Brinsmead .................. | 345/419 |
| 5,831,590 A | * | 11/1998 | Ikedo .......................... | 345/629 |
| 5,870,096 A | * | 2/1999 | Anjyo et al. ................ | 345/426 |
| 6,034,698 A | * | 3/2000 | Yasuda ........................ | 345/641 |
| 6,453,052 B1 | * | 9/2002 | Kurokawa et al. .......... | 382/100 |
| 6,633,289 B1 | * | 10/2003 | Lotens et al. ............... | 345/419 |

FOREIGN PATENT DOCUMENTS

| | | |
|---|---|---|
| JP | 4-195476 | 7/1992 |
| JP | 5-61961 | 3/1993 |
| JP | 2000-3455 | 1/2000 |

OTHER PUBLICATIONS

Anjyo et al., "A Simple Method for Extracting the Natural Beauty of Hair", 1992, ACM, pp 111–120.*
Kajiya et al., "Rendering Fur with Three Dimensional Textures", 1989, ACM, pp 271–280.*
Chen, et al., "A system of 3D hair style synthesis based on the wisp model," The Visual Computer, vol. 15, 1999, pp. 159–170.

* cited by examiner

*Primary Examiner*—Almis Jankus
(74) *Attorney, Agent, or Firm*—Bell, Boyd & Lloyd LLC

(57) ABSTRACT

An apparatus and method for the biometric identification of a person, who has an authentic area containing biometric features, the apparatus including a sensor having an identification area for detecting the biometric features of the part of the person's authentication area which is situated on the identification area, a comparison device for comparing the detected biometric features with biometric features, stored in a memory, of a part of the authentication area of an authorized person or of a number of authorized persons in order to determine the relative position of the biometric features detected by the sensor within the part of the authentication area, and a computation device for calculating an identification code, which identifies the person detected by the sensor, from the detected biometric features which are not stored in the memory on the basis of the relative position of the biometric features which are stored in the memory within the stored authentication area.

24 Claims, 16 Drawing Sheets

HEAD-PART MODEL        HAIR-STYLE DATA

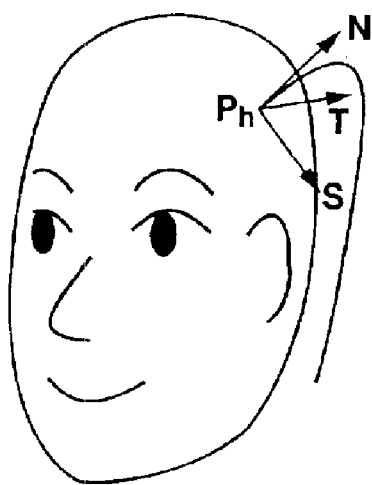
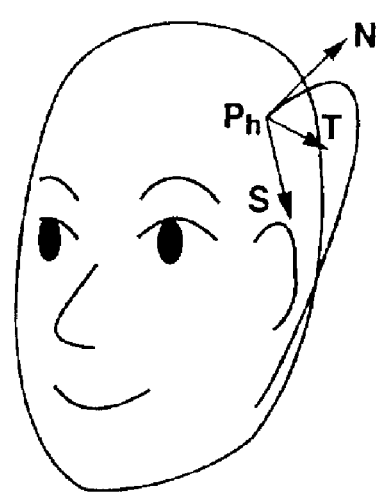
HEAD-PART MODEL            HEAD-PART MODEL
FIG.13A                FIG.13B

HEAD-PART MODEL

HEAD-PART MODEL

HEAD-PART MODEL

HEAD-PART MODEL

IMAGE PROCESSOR AND IMAGE PROCESSING METHOD, AND RECORDED MEDIUM

BACKGROUND OF THE INVENTION

The present invention relates to an image processing apparatus, an image processing method, and a recording medium which are suitable for synthesizing a hair image expressed by computer graphics with a three-dimensional shape image of a head part.

Conventionally, as a method for expressing human hair by computer graphics (hereinafter abbreviated as CG), it is useful to take a method in which an entire hair style is approximated to a polygon model, as shown in FIG. 1A, and a texture of hairs is adhered to the model, or a method in which rendering is performed with use of an anisotropic reflection model which has different reflection intensities respectively with respect to light source positions or viewpoint positions.

These methods are described in "Hair expression using an anisotropic reflection model" by Yamana and Suenaga, Singakugihou, PRU87-3, pp. 115 to 120, 1989. In these methods, expression of a hair style is just the shape of a polygon model itself, and the hair style can be changed by changing the shape of the polygon model.

A proposal has been made for a method of expressing hair by a particle system. In the particle system, when a large quantity of particle objects are dealt with, characteristics such as weight and the like of each particle are given as parameters, and particles are generated under a certain rule. Thus, a large quantity of particle objects can be expressed easily.

Meanwhile, the present applicant has proposed a method of approximating every hair of a hair-style to a curve, as shown in FIG. 1B, in Japanese Patent Application No. 10-164545, for example. This method is successful in natural expression of a hair style image.

A method of designing a hair style by editing together a plurality of hairs approximated to a curve is described in "Development of a hair design system using tuft models" by Kishi, Saegusa, and Morishima, in Shingakugihou, MVE97-102, pp. 67–74, 1998.

It is difficult for the method of approximating the entire hair style to a polygon model to express a complicated hair style. In this method, movements (flows) of hair cannot be expressed.

On the other side, the method of expressing hair by a particle system and the method of approximating every hair to a geometric figure can express any arbitrary hair style and movements of hair. However, in the method of expressing hair by the particle system, parameters for particles expressing hairs must be controlled to control the hair style, so that intuitive control is difficult. It is therefore difficult to generate an intended hair style.

In the method described in "Development of a hair design system using tuft models" by Kishi, Saegusa, and Morishima, in Shingakugihou, MVE97-102, pp. 67–74, 1998, an intended hair style can be generated relatively easily. This method, however, has a problem in that hair cannot be changed to intended hair styles corresponding to a plurality of different head shapes although hair corresponding only to one fixed head shape can be changed to an intended hair style.

SUMMARY OF THE INVENTION

One of the objects of the present invention is changing a hair style consisting of hairs of which is expressed by CG, so as to correspond to a number of different head shapes.

The present invention provides an image processing apparatus for synthesizing a hair image with a three-dimensional shape image of a head part, to generate a hair-style-matched image, including: a storage part for storing a hair-style data piece; a read out part for reading out the hair-style data piece stored in the storage part; a mapping part for mapping a hair data piece corresponding to a hair and contained in the hair-style data piece read out by the read out part, at a predetermined position on the three-dimensional shape image of the head part; and a generation part for generating the hair-style-matched image, based on a mapping result obtained by the mapping part.

As the hair data piece, it is possible to use three-dimensional curve data which is constructed by a number of control points.

As the hair data piece, it is possible to use polygon data which is constructed by a number of polygons.

The storage part stores the hair-style data piece constructed by hair data pieces arranged on a two-dimensional array. In particular, the storage part stores the hair-style data piece constructed by data pieces arranged on a two-dimensional array corresponding to a projected image obtained by projecting a three-dimensional hair style expressed by a columnar coordinate system, on a two-dimensional coordinate system.

The apparatus according to the present invention further includes an interpolation part for interpolating the hair data piece at the predetermined position, with use of a hair data piece close to the predetermined position. The interpolation part interpolates the hair data piece, based on group information contained in the hair data piece close to the predetermined position.

The mapping part includes a coordinate conversion part for converting the hair data piece expressed by a first coordinate system into data of a second coordinate system by which the three-dimensional shape image of the head part is expressed.

The coordinate conversion part converts the hair data piece expressed by the first coordinate system into data of a local coordinate system having an origin on a surface of the head part, and thereafter converts the data into data of the second coordinate system by which the three-dimensional shape image of the head part is expressed.

When the hair data piece expressed by the first coordinate system is converted into the data of the second coordinate system by which the three-dimensional shape image of the head part is expressed, the coordinate conversion part executes at least one of coordinate axis rotation and origin shift, based on a random number.

Also, the present invention provides an image processing method for synthesizing a hair image with a three-dimensional shape image of a head part, to generate a hair-style-matched image, including: a storage step of storing a hair-style data piece; a read out step of reading out the hair-style data piece stored by processing in the storage step; a mapping step of mapping a hair data piece corresponding to a hair and contained in the hair-style data piece read out by processing in the read out step, at a predetermined position on the three-dimensional shape image of the head part; and a generation step of generating the hair-style-matched image, based on a mapping result obtained by processing in the mapping step.

In the processing in the storage step according to the present invention, the hair-style data piece constructed by hair data pieces arranged on a two-dimensional array is stored.

Also, in the processing in the storage step, the hair-style data piece constructed by data pieces arranged on a two-dimensional array corresponding to a projected image obtained by projecting a three-dimensional hair style expressed by a columnar coordinate system, on a two-dimensional coordinate system, is stored.

The method according to the present invention further includes an interpolation step of interpolating the hair data piece at the predetermined position, with use of a hair data piece close to the predetermined position.

In processing in the interpolation step, the hair data piece is interpolated, based on group information contained in the hair data piece close to the predetermined position.

The processing in the mapping step includes a coordinate conversion step of converting the hair data piece expressed by a first coordinate system into data of a second coordinate system by which the three-dimensional shape image of the head part is expressed.

In processing in the coordinate conversion step, the hair data piece expressed by the first coordinate system is converted into data of a local coordinate system having an origin on a surface of the head part, and thereafter, the data is converted into data of the second coordinate system by which the three-dimensional shape image of the head part is expressed.

When the hair data piece expressed by the first coordinate system is converted into the data of the second coordinate system by which the three-dimensional shape image of the head part is expressed, at least one of coordinate axis rotation and origin shift is executed, based on a random number, in processing in the coordinate conversion step.

Further, the present invention provides a recording medium which records a computer-readable program for image processing of synthesizing a hair image with a three-dimensional shape image of a head part, to generate a hair-style-matched image, the program including: a storage step of storing a hair-style data piece; a read out step of reading out the hair-style data piece stored by processing in the storage step; a mapping step of mapping a hair data piece corresponding to a hair and contained in the hair-style data piece read out by processing in the read out step, at a predetermined position on the three-dimensional shape image of the head part; and a generation step of generating the hair-style-matched image, based on a mapping result obtained by processing in the mapping step.

In the processing in the storage step, the hair-style data piece constructed by the hair data pieces arranged on a two-dimensional array is stored.

In the processing in the storage step, the hair-style data piece constructed by data pieces arranged on a two-dimensional array corresponding to a projected image obtained by projecting a three-dimensional hair style expressed by a columnar coordinate system, on a two-dimensional coordinate system, is stored.

According to the present invention, the program further includes an interpolation step of interpolating the hair data piece at the predetermined position, with use of a hair data piece close to the predetermined position.

In processing in the interpolation step, the hair data piece is interpolated, based on group information contained in the hair data piece close to the predetermined position.

The processing in the mapping step includes a coordinate conversion step of converting the hair data piece expressed by a first coordinate system into data of a second coordinate system by which the three-dimensional shape image of the head part is expressed.

In processing in the coordinate conversion step, the hair data piece expressed by the first coordinate system is converted into data of a local coordinate system having an origin on a surface of the head part, and thereafter, the data is converted into data of the second coordinate system by which the three-dimensional shape image of the head part is expressed.

When the hair data piece expressed by the first coordinate system is converted into the data of the second coordinate system by which the three-dimensional shape image of the head part is expressed, at least one of coordinate axis rotation and origin shift is executed, based on a random number, in processing in the coordinate conversion step.

In the above-described image processing apparatus and method according to the present invention, hair-style data is stored, and the stored hair-style data is read out. Hair data corresponding to a hair and included in the read out hair-style data is mapped at a predetermined position on a three-dimensional shape image of a head part. Based on the mapping results, a hair-style-matched image is generated. The stored hair-style data is constructed by pieces of hair data arranged on a two-dimensional array.

Additional features and advantages of the present invention are described in, and will be apparent from, the following Detailed Description of the Invention and the Figures.

BRIEF DESCRIPTION OF THE FIGURES

FIGS. 13A and 13B are views for explaining coordinate axis rotation in coordinate conversion.

DETAILED DESCRIPTION OF THE INVENTION

Figures 1A, 1B:
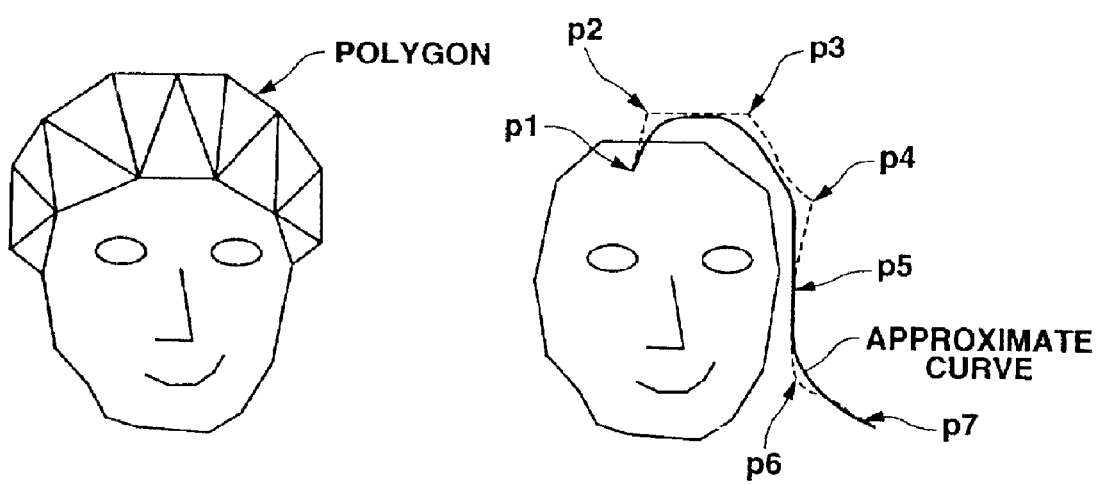
FIGS. 1A and 1B are views showing an example of conventional hair expression.
Figure 2:
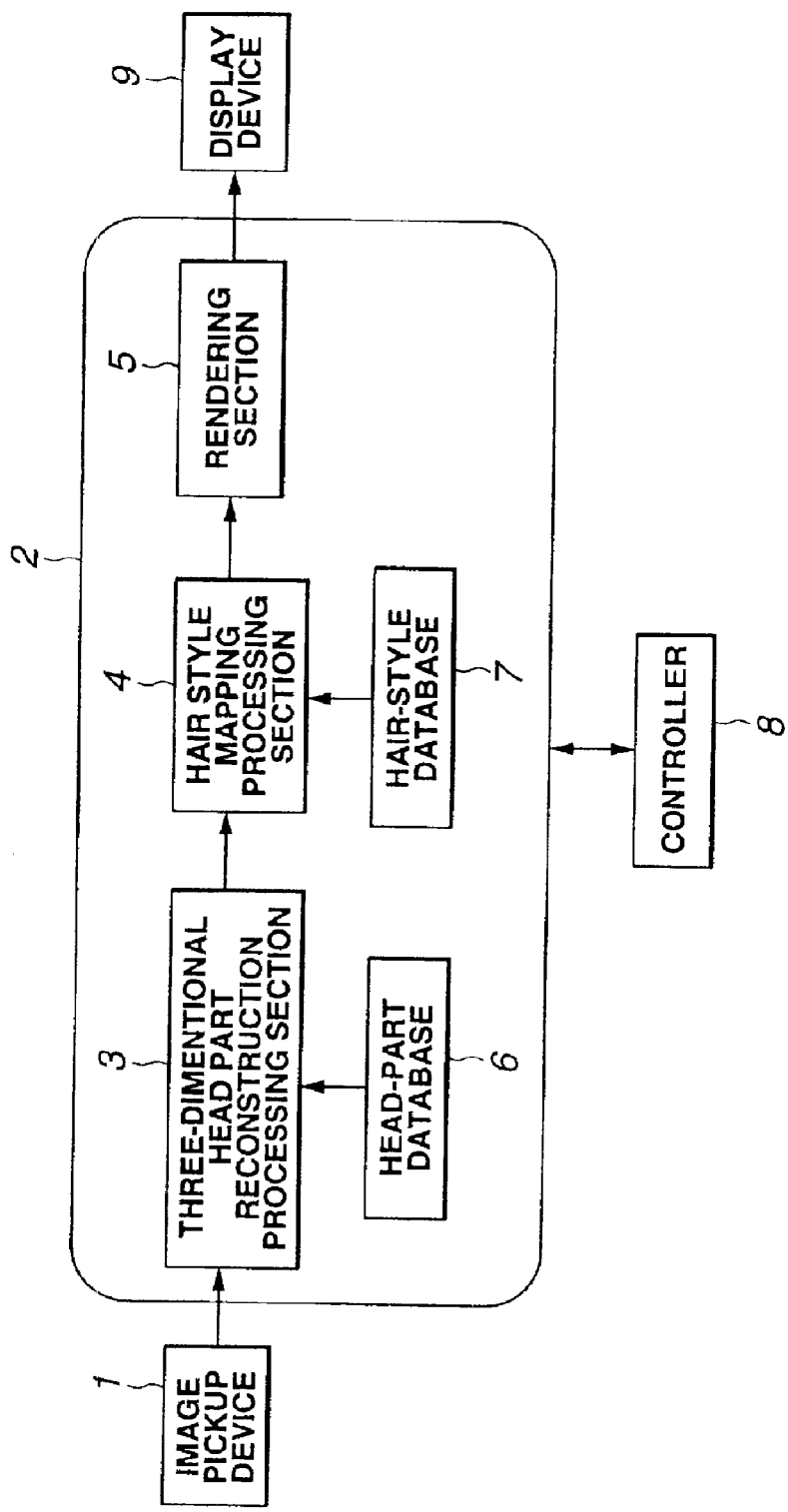
FIG. 2 is a block diagram showing a structural example of a hair synthesis system to which the present invention is applied.

A hair synthesis system to which the present invention is applied will be explained with reference to FIG. 2. This hair synthesis system includes: an image pickup device 1 which picks up an image of a neck part (the part above the neck, including the neck) of a person; an image processing device 2 for generating a three-dimensional shape model of the neck part, based on the image of the picked-up neck part, synthesizing a CG of an arbitrary hair style, and generating a hair-style-matched image; and a display device 9 for displaying the generated hair-style-matched image. If this hair synthesis system is installed in a beauty salon, a barber's shop, or the like, it can be used to assist customers to select hair styles or so.

The image pickup device 1 of the hair synthesis system combines a three-dimensional shape measurement device such as a stereo camera, a range finder, or the like, and a two-dimensional image input device such as a CCD (Charge Coupled Device) or the like. In case of a stereo camera, the three-dimensional measurement device of the image pickup device 1 picks up an image of the head part of a person (a customer of a beauty salon or the like) as a target object, several times from a different kinds of direction, and performs predetermined image processing on the image, to obtain a three-dimensional shape of the face part (which is a part obtained by removing a hair part from the neck part). In case of a range finder, the neck part of the person as the target object is subjected to laser scanning, thereby measuring the distance, to obtain a three-dimensional shape of the neck part. The two-dimensional input device of the image pickup device 1 picks up an image of the neck part of the person as the target object, to obtain a texture corresponding to the three-dimensional shape of the face part.

In general, the three-dimensional shape measurement device of the image pickup device 1 cannot obtain three-dimensional shape data with respect to a part of dark color which absorbs light from an object, e.g., a part such as a head part having black hair or metal which reflects light. Therefore, the image pickup device 1 outputs three-dimensional shape data of the part such as the face or the like, which will be hereinafter called a face part, i.e., the other part of the head part than the hair, and texture image data associated with the three-dimensional shape data of the face part.

A number of three-dimensional shape measurement devices and two-dimensional image input devices may be used for constructing the image pickup device 1, in order to measure the neck part of the person as an object (which will be described hereinafter as a customer) from many directions.

The image processing device 2 is constructed by: a three-dimensional head part reconstruction processing section 3 for synthesizing three-dimensional shape data read from a head-part database 6 with three-dimensional shape data inputted from the image pickup device 1, to construct a three-dimensional model of the neck part; a hair style mapping processing section 4 for mapping hair-style data read from the hair-style database 5 over the three-dimensional model of the neck part; a rendering section 5 for rendering the three-dimensional model of the neck part on which the hair-style data has been mapped, thereby to generate hair-style-matched image data; a head-part database 6 in which three-dimensional shape data of a number of head parts are previously recorded; a hair-style database 7 in which a number of hair-style data items are previously recorded; and a controller 8 which is operated by a user to instruct selection of three-dimensional shape data of a head part stored in the head-part database 6, a hair-style data item stored in the hair-style database 7, or the like.

The hair-style data stored in the hair-style database 7 is edited and generated with use of a three-dimensional graphic modeler or the like. Therefore, even a hair style which is actually difficult to make up can be generated and stored. The data structure of the hair-style database 7 will be described later with reference to FIG. 11. The display device 9 is constructed by a LCD (Liquid Crystal Display) or CRT (Cathode Ray Tube) and the like, and displays a hair-style-matched image inputted from the image processing device 2.

Figure 3:
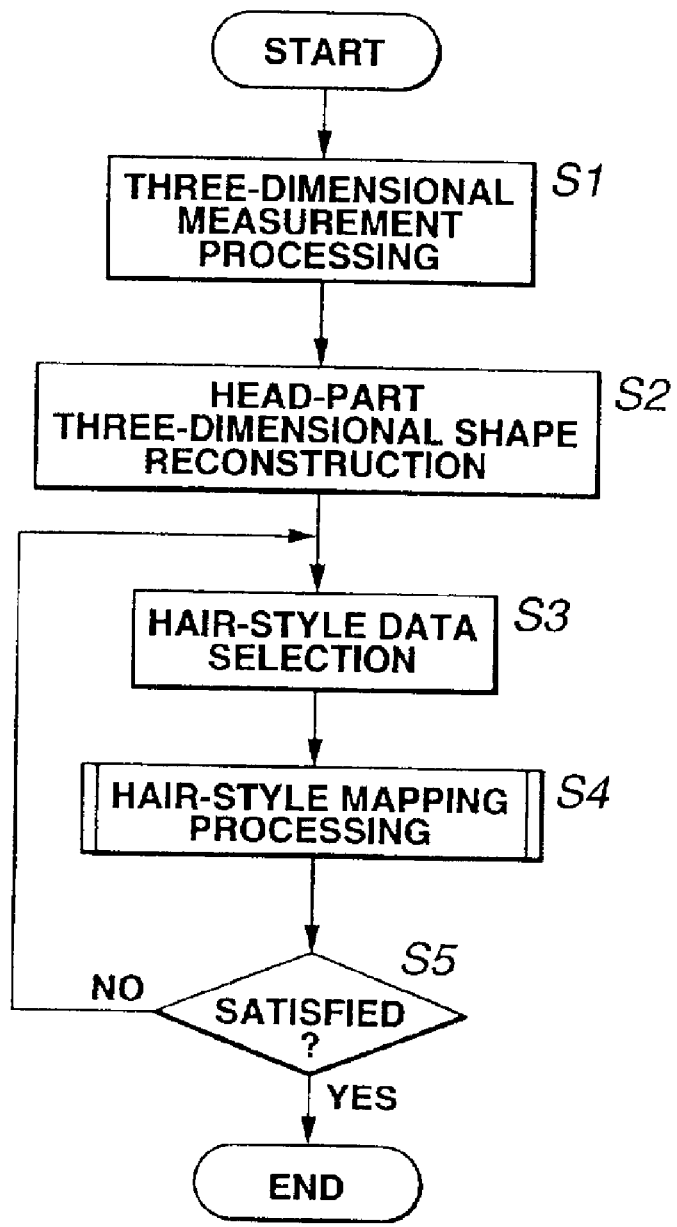
FIG. 3 is a flowchart explaining operation of the hair synthesis system.

Next, the operation of the hair synthesis system will be explained with reference to the flowchart of FIG. 3 and FIG. 4. In the step S1, the image pickup device 1 picks up an image of the a neck part of a customer as a target object or laser-scans the neck part, to measure its three-dimensional shape, and outputs three-dimensional shape data and texture image data of the neck part of the customer to the image processing device 2.

The measurement method of measuring the three-dimensional shape may be any method; e.g., a method of using a stereo camera, a method of using a range finder, or the like. As described previously, however, the three-dimensional shape measurement device of the image pickup device 1 cannot obtain three-dimensional shape data of the hair part. Therefore, three-dimensional shape data and texture image data (shown as measurement data in which a texture image is applied to three-dimensional shape data of the face part in FIG. 4) of the face part of the customer is outputted by the processing in the step S1. If a number of three-imensional shape measurement devices and two-dimensional image input devices are provided in the image pickup device 1, a number of sets each including three-dimensional shape data of the face part and texture image data are outputted.

In the step S2, the three-dimensional head part reconstruction processing section 2 of the image processing device 2 constructs a three-dimensional shape model of a head part of a customer by using measurement data of the face part inputted from the image pickup device 1, i.e., the three-dimensional shape data and texture image data.

Figure 4:
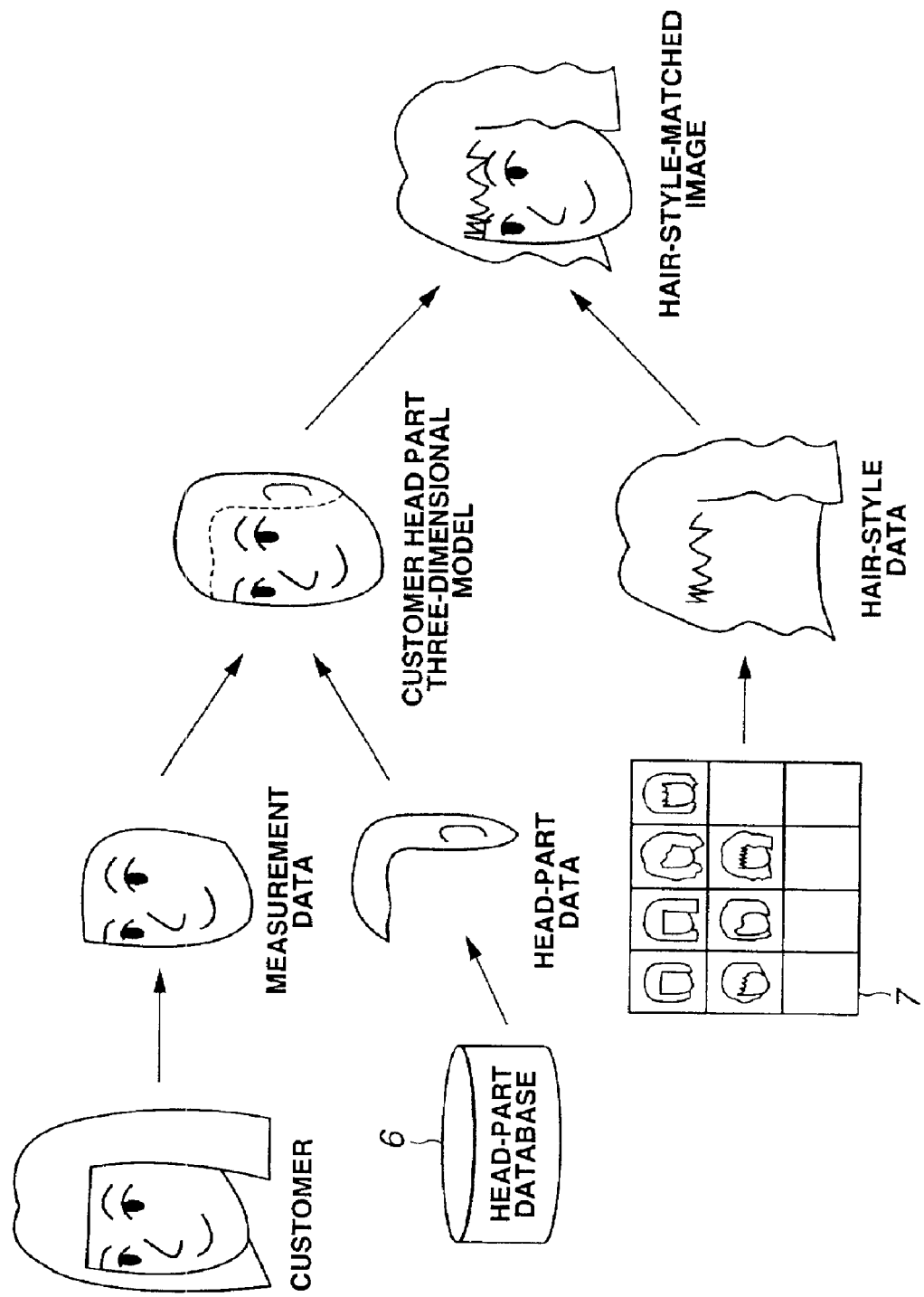
FIG. 4 is a view for explaining the operation of the hair synthesis system.

Specifically, as shown in FIG. 4, head-part data selected and read from the head-part database 6 is combined with the measurement data of the face part of the customer, to reconstruct a perfect three-dimensional model of the head part of the customer. The head-part database 6 is constructed by three-dimensional models of a number of head parts having arbitrary shapes. The head-part data is subjected to scaling and positional aligning, based on the size and direction in the measurement data of the face part of the customer, and is then combined with the measurement data of the customer.

The combination of the head-part data piece with the measurement data piece of the customer may generate a new polygon between open edges in both data pieces, or an open edge in one data piece may be changed to fit an open edge of the other data piece.

The three-dimensional shape of the head part of the customer thus constructed is expressed, for example, as a triangle-polygon model. In the three-dimensional model of the head part of the customer thus constructed, hair is removed from the real image of the customer as shown in FIG. 4.

In the step S3, operation of selecting hair-style data stored in the hair-style database 7 by a user (the customer or the like) is received by the controller 8. The selected hair-style data is read out from the hair-style database 7, and is supplied to the hair style mapping processing section 4.

In this hair style selection, icons, thumbnails, or the like indicating hair styles are displayed on the display device 9 to invite the user to make a selection. The selection may be done by moving a cursor or the like on the screen of the display device 9 or by inputting a number or the like designating a hair style.

Figure 5:
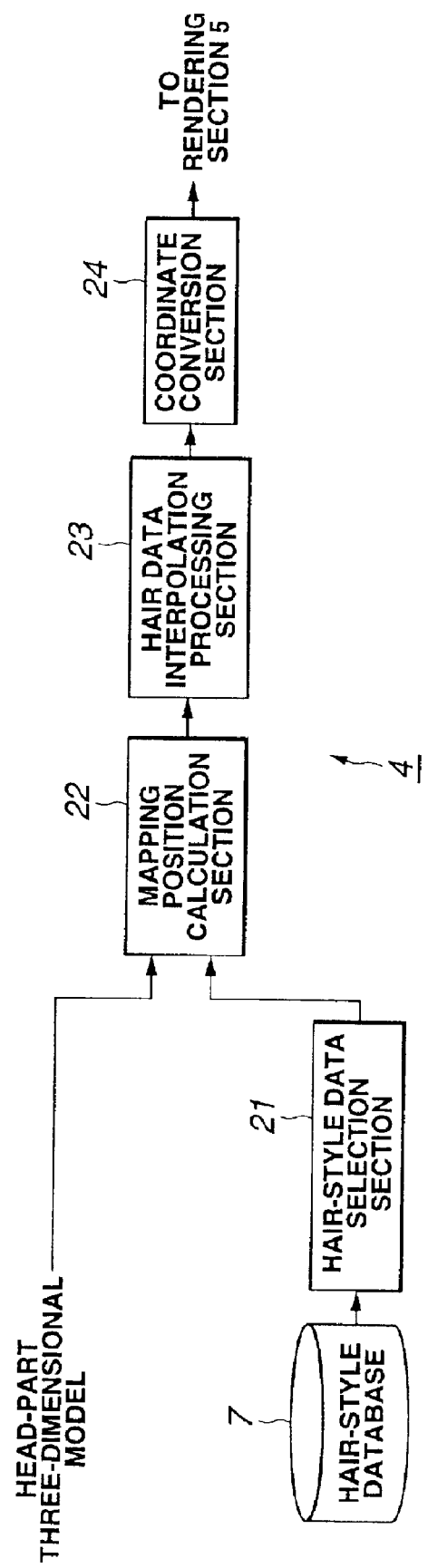
FIG. 5 is a block diagram showing a structural example of processing in the hair-style mapping processing section shown in FIG. 2.

In the step S4, the hair style mapping processing section 4 of the image processing device maps the supplied hair-style data on the three-dimensional mode of the head part of the customer supplied from the three-dimensional head part reconstruction processing section 3, and outputs the result to the rendering part 5. In the processing of mapping the hair-style data, hair data corresponding to each one of the hairs, which is included in the hair-style data, is mapped on the surface of the three-dimensional model of the head part, in accordance with the shape of the three-dimensional model of the head part, by the same manner as taken for texture mapping. Details of the mapping processing will be described later with reference to FIGS. 5 and 6.

In the step S5, the rendering section 5 renders the three-dimensional model of the head part of the customer, on which the hair-style data has been mapped, to generate hair-style-matched image data as shown in FIG. 4, and outputs it to the display device 9. The method of rendering adopts texture mapping processing for a polygon model with respect to the face part of the three-dimensional model, and also rendering processing for a curvature model with respect to the hair part. The rendering processing for a curvature model is disclosed in details in, for example, "Simulation based on a motion model of a string-like object and CG" by Kobayashi, Morishima, and Harashima, Shingakugihou, PRU90-127, pp. 15–20, 1991.

The display device 9 displays an image corresponding to the inputted hair-style-matched image data. The controller 8 invites a user (a customer or the like) to input whether or not the user is satisfied with the hair-style-matched image displayed on the display device 9.

At this time, the user can operate the controller 8 to watch the hair-style-matched image while changing the viewpoint position and the illumination position. If the viewpoint position and the illumination position are changed, the rendering section 5 executes again the rendering processing on the three-dimensional model of the head part and the hair-style data, so as to correspond to the changed condition (the viewpoint position and the illumination position) and outputs the result to the display device 9.

In the step S5, if an input indicating that the user is not satisfied is received, the processing returns to the step S3, and the later processing is repeated. In the step S5, if it is determined that an input indicating the user's satisfaction is received from the user, this processing is terminated.

Next, an explanation will be made of the hair-style mapping processing based on the hair-style mapping processing section 4 in the step S4. Beforehand, a structural example of the hair-style mapping processing section 4 will be explained with reference to FIG. 5.

The hair-style data read out section 21 of the hair-style mapping processing section 4 reads hair-style data selected with use of the controller 8, from the hair-style database 7, and outputs it to the mapping position calculation section 22. The mapping position calculation section 22 calculates the position on the three-dimensional model where hair data (corresponding to a hair) forming part of the hair-style data should be mapped. A hair data interpolation processing section 23 obtains hair data to be mapped, by interpolation from the peripheral hair data around the hair-style data. The coordinate conversion section 24 maps the interpolated hair data by coordinate conversion from the object coordinate system of the hair data to the object coordinate system of the three-dimensional model of the head part.

Figure 6:
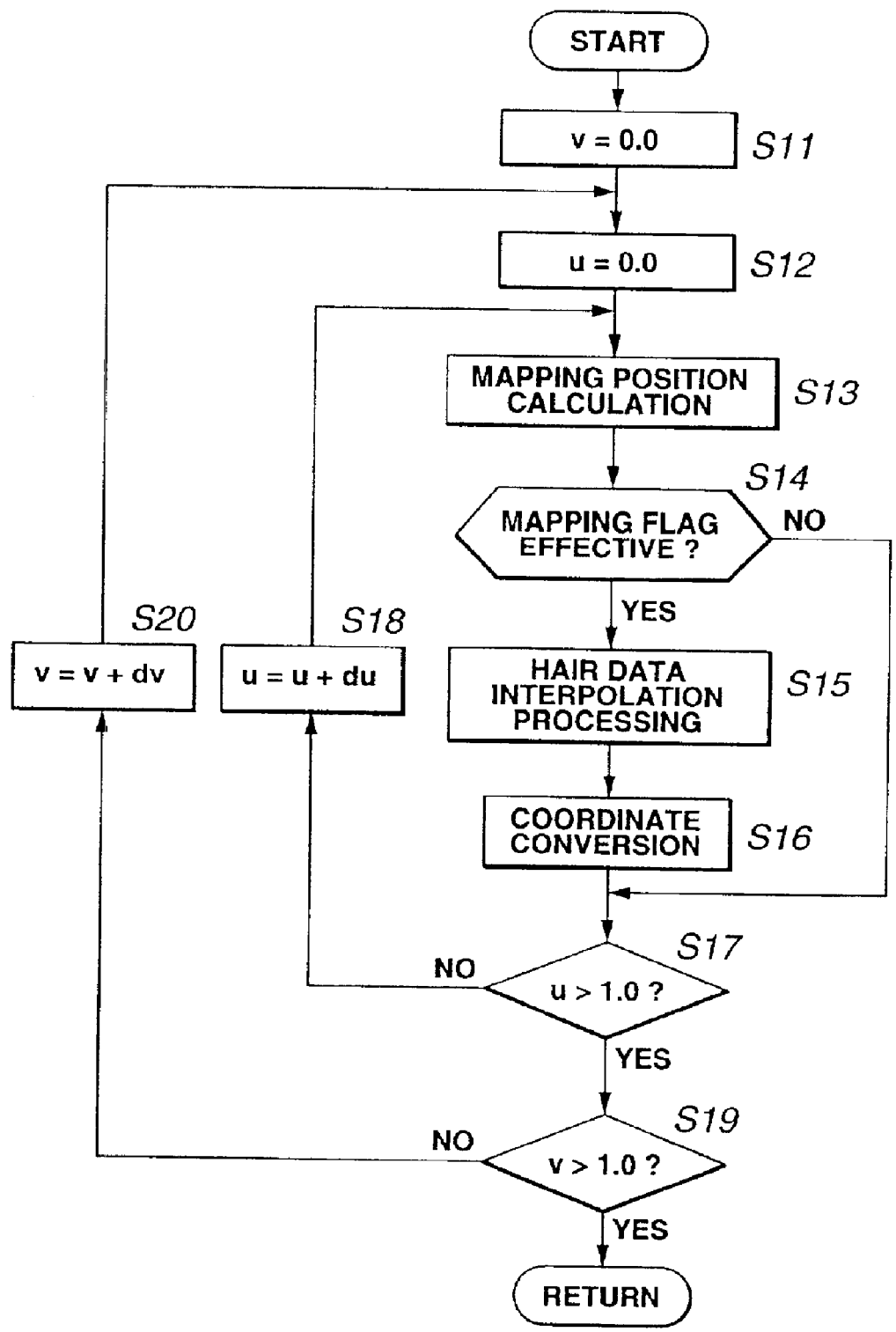
FIG. 6 is a flowchart for explaining processing in the hair-style mapping processing section.

Next, details of the hair style mapping processing of the hair style mapping processing section 4 will be explained with reference to the flowchart shown in FIG. 6. The mapping position calculation section 22 of the hair style mapping processing section 4 has already been supplied with hair-style data from the hair-style data read out section 21.

The hair-style data supplied to the mapping position calculation section 22 is obtained by two-dimensionally arranging hair data approximated to an object having a three-dimensional shape, as shown in FIG. 7.

Figure 7B:
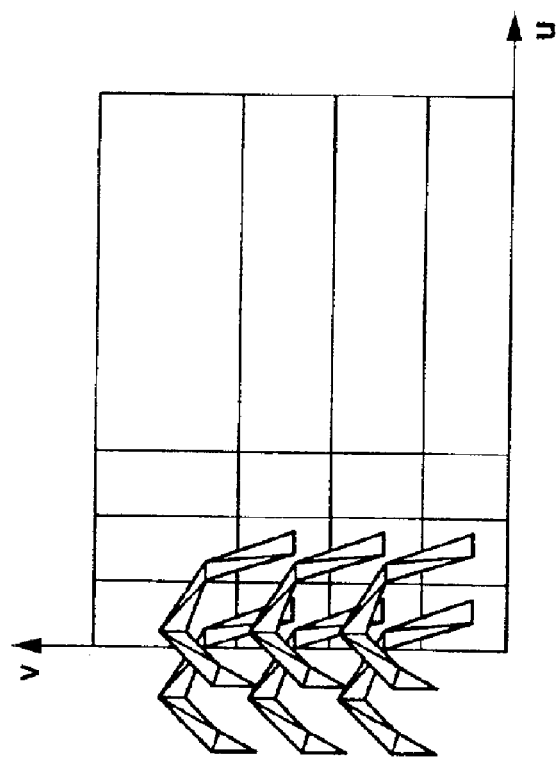
FIGS. 7A and 7B are views for explaining hair-style data in which hair data is two-dimensionally arrayed.
Figure 7A:
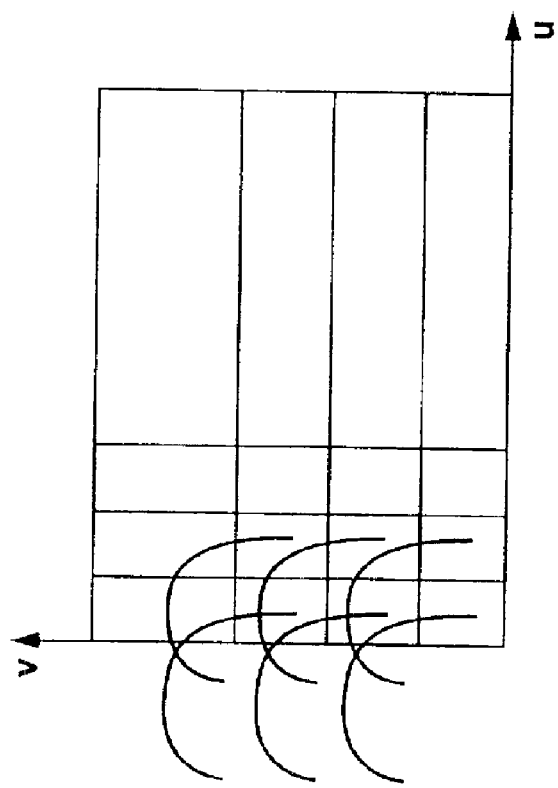

In the example of FIG. 7A, every hair is approximated to a special curve such as a three-dimensional B-spline curve or the like. In the example of FIG. 7B, every hair is approximated to a polygon model. The addresses in the two-dimensional array correspond to mapping coordinate values supplied to the three-dimensional model of the head part on which the hair style is mapped, like the texture mapping processing. For example, if a mapping coordinate (u, v)=(0.1, 0.1) is given to a vertex of a predetermined polygon of the three-dimensional model of the head part, the address on the hair-style data array of the hair data which is mapped on the vertex is $0.1 u_{max}$, $0.1 v_{max}$. Where, the $u_{max}$ is the number of data pieces in the u-direction on the hair-style data array, and $v_{max}$ is the number of data pieces in the v-direction on the hair-style data array.

The hair-style data is defined by arranging the hair data having an arbitrary three-dimensional shape into a two-dimensional array. Therefore, any arbitrary hair style can be expressed, and it is possible to generate hair-style data of a hair style which is difficult to cut. A method of generating hair-style data will be described later with reference to FIG. 16.

At first, in the step S11, the mapping position calculation section 22 initializes the count value u in the longitudinal direction of the hair-style data array to 0.0. In the step S12, the count value u in the lateral direction of the hair-style data array is initialized to 0.0.

In the step S13, the mapping position calculation section 22 calculates the position on the three-dimensional model of the head part where hair data expressed by the address (u, v) of the hair-style data array is mapped.

Figure 8:
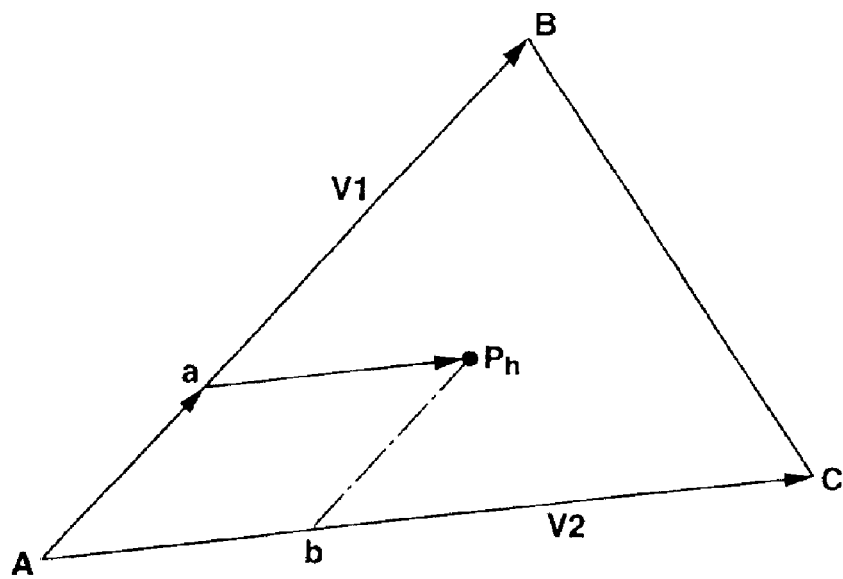
FIG. 8 is a view for explaining mapping position calculation in the step S13 shown in FIG. 6.

FIG. 8 shows an arbitrary triangle polygon on the three-dimensional model of the head part. The vertexes A, B, and C of the triangle polygon respectively have attribute vectors $A_{attr}$, $B_{attr}$, and $C_{attr}$ which express attributes of the three-dimensional model of the head part.

The attribute is constructed by an object coordinate value of the three-dimensional model of the head part, local coordinate axes at a vertex, and a mapping coordinate value of hair.

Where vectors which form two arbitrary edges of the triangle polygon ABC are vectors V1 and V2, the vectors V1 and V2 can be expressed by the next expression (1) with use of the attribute vectors of respective vertexes.

$$V1 = B_{attr} - A_{attr}$$

$$V2 = C_{attr} - A_{attr} \qquad (1)$$

Considering that the vectors V1 and V2 are the coordinate axes of the triangle polygon ABC, an arbitrary point Ph on the triangle polygon ABC can be expressed by the next expression (2).

$$P_h = A_{attr} + aV1 + bV2 \quad (2)$$

At this time, as shown in FIG. 8, coefficients a and b are defined in a manner that lengths between an arbitrary point Ph and points at each of which a line parallel to one axis and extended from the arbitrary point crosses the other axis are normalized by the lengths of axial vectors, respectively.

Where the mapping coordinate values of the vertexes A, B, and C are respectively $(u_a, v_a)$, $(u_b, v_b)$, and $(u_c, v_c)$, attention is paid to the point $P_h$ expressed by the expression (2), in relation to the elements of the mapping coordinate values. The next expression (3) then exists.

$$U_h = U_a + a(U_b + U_a) + b(U_c - U_a)$$
$$V_h = V_a + a(V_b - V_a) + b(V_c - V_a) \quad (3)$$

The expression (3) exists with respect to an arbitrary point in the (U,V) space.

If the counter value $u=u_p$ and the counter value $v=v_p$, the condition for satisfying that the point Ph on the three-dimensional model of the head part where hair data should be mapped exists inside the triangle polygon is expressed by the next expression (4).

$$a+b \leq 1 \quad (4)$$

That is, in the arbitrary triangle polygon of the three-dimensional model of the head part, if the coefficients a and b obtained by substituting $u_h = u_p$ and $v_h = v_p$ in the expression (3) satisfy the expression (4), the point $P_h$ exists inside the triangle polygon. Therefore, the hair data expressed by $(u_p, v_p)$ on the hair-style data array is mapped on the triangle polygon. Accordingly, the mapping position of the hair data on the three-dimensional model of the hair data is calculated by using the expression (2) in the mapped triangle polygon.

Returning to FIG. 6, in the step S14, the mapping position calculation section 22 determines whether or not the triangle polygon of the three-dimensional model of the head part to be mapped is a hair generation region. This determination is carried out, based on a flag (positive or negative) which indicates whether or not hair data added to each triangle polygon of the three-dimensional model of the head part should be mapped.

If the mapping flag of the triangle polygon including the mapping position obtained by the processing in the step S13 is positive, the triangle polygon is determined to be a hair generation region, and the processing goes to the step S15.

In the step S15, the hair data interpolation processing section 23 interpolates hair data, which is expressed as $(u_p, v_p)$ and should be mapped, with use of hair data stored in the hair-style data array. The interpolation method may use an average value of four close points or may use a summation average value of four close points. Alternatively, the closest point may be directly used without interpolation.

Figure 9:
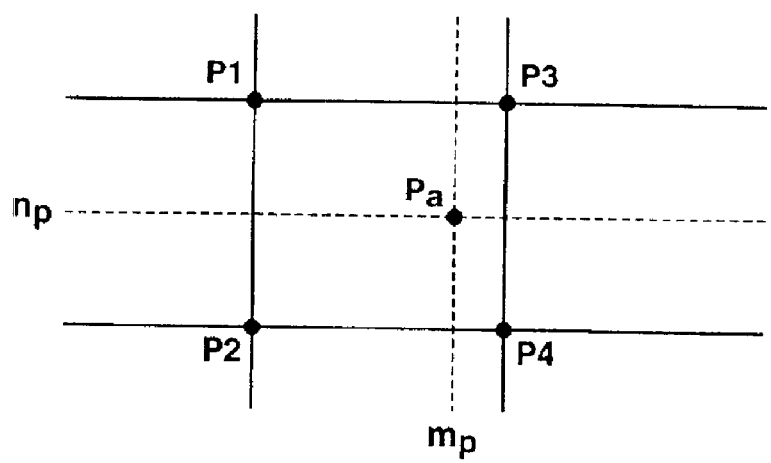
FIG. 9 is a view for explaining hair data interpolation processing in the step S15 shown in FIG. 6.

FIG. 9 shows a method of using a summation average value from four close points. Supposing now that the counter value $u=u_p$ and the counter value $v=v_p$, the hair-style data array address of the hair data to be mapped is $P_a=(m_p, n_p)=(u_p u_{max}, v_p v_{max})$. The hair data at the point $P_a$ is Hp, and the close 4 points are P1 to P4 as shown in FIG. 9. The hair data pieces at the point P1 to P4 are respectively H1 to H4.

In the summation average method from 4 close points, the hair data Hp to be mapped is interpolated from the data of the 4 close points with use of the next expression (5).

$$Hp = dm(dn\ H2 + (1-dn)\ H1) + (1-dm)(dn\ H4 + (1-dn)\ H3) \quad (5)$$

If the hair data is a special curve such as a three-dimensional B-spline curve or the like as shown in FIG. 7A, the interpolation processing of the hair data is obtained by interpolation of data of each control point. Meanwhile, if the hair data is a polygon model as shown in FIG. 7B, the interpolation processing of the hair data is obtained by interpolation between respective polygon vertex data pieces. In the expression (4), dm is the decimal part of $m_p$, and dn is the decimal part of $n_p$.

Returning to FIG. 6, in the step S16, the coordinate conversion section 24 coordinate converts hair data subjected to interpolation processing, from the object coordinate system of the hair data into the object coordinate system of the three-dimensional model of the head part.

Figure 10A:
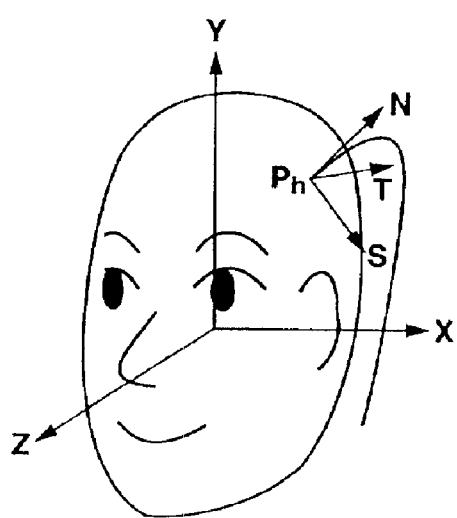
FIGS. 10A and 10B are views for explaining coordinate conversion in the step S16 shown in FIG. 6.
Figure 10B:
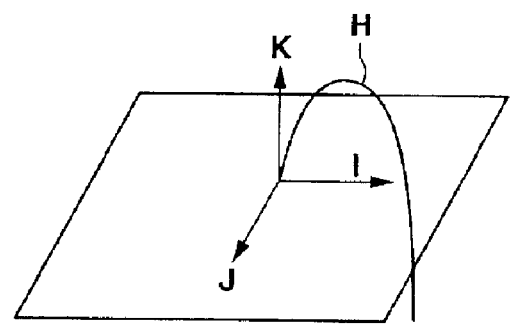

The concept of the coordinate conversion will be explained with reference to FIGS. 10A and 10B. Suppose that an arbitrary hair data piece on the hair-style data array is H. The hair data H is expressed as (I, J, K) according to the object coordinate system of the hair data. The object coordinate system (I, J, K) of the hair data may be arbitrarily given in case of a three-dimensional coordinate system in which the start point of the hair data H is an origin. For example, this is an orthogonal coordinate system in which the lateral direction of the hair-style data array is I, the longitudinal direction thereof is J, and a direction perpendicular to these directions is K. Thus, the start point of the hair data H is expressed as (I, J, K)=(0, 0, 0), and the other control points are expressed by relative positions from the start point of the hair data.

Meanwhile, the three-dimensional model of the head part is expressed as an object coordinate system (X, Y, Z). The object coordinate system of the three-dimensional model of the head part is generally a three-dimensional orthogonal coordinate system, e.g., an orthogonal coordinate system in which the direction toward the right ear from the gravity center position of the head part as an origin is X, the direction toward the top of the head is Y, and the direction toward the nose is Z.

The coordinate conversion section 24 converts the hair data H expressed by the object coordinate system (I, J, K) of the hair data into a local coordinate system (T, S, N) at the mapping position $P_h$ of the three-dimensional model of the head part obtained in the step S13. The local coordinate system (T, S, N) at this point $P_h$ can be arbitrarily determined in case of the three-dimensional coordinate system using the point $P_h$ as an origin. For example, it is an orthogonal coordinate system in which N is the vector in the normal line direction at the point $P_h$, T is the vector in the tangent direction, which is obtained as a vector product of the vector in the radial direction toward the point $P_h$ from the center axis (Y-axis in FIG. 10) in the longitudinal direction of the three-dimensional model of the head part and the vector N in the normal line direction, and S is the vector perpendicular to the normal line direction N and the tangent direction T.

Suppose that the local coordinate system at each vertex of the three-dimensional model of the head part is previously given in the head-part database. Therefore, like the calculation of the mapping position, the local coordinate system (T, S, N) at the point $P_h$ is calculated with use of the expression (2) in the triangle polygon to be mapped. Supposing that data at the object coordinate system (I, J, K) of an arbitrary control point $C_i$ of the hair data H is (i, j, k), the control point $C_i$ is expressed by the next expression (6) in the local coordinate system (T, S, N) at the point $P_h$.

$$C_i = i\ T + j\ S + k\ N \quad (6)$$

Where, the unit vectors of the local coordinate system (T, S, N) respectively have values of the object coordinate system (X, Y, Z) of the three-dimensional model of the head part.

Therefore, the control point $C_i$ expressed by the expression (6) is expressed by the object coordinate system (X, Y, Z) of the three-dimensional model of the head part.

Returning to FIG. 6, in the step S17, the mapping position calculation section 22 determines whether or not the counter value u exceeds 1.0. If the counter value u is not determined to exceed 1.0, the processing goes to the step S118. In the step S18, the mapping position calculation section 22 increase the counter value u by an increment value du. The increment value du indicates how long pitch hair data stored in the hair-style data array is mapped in the lateral direction.

Thereafter, the processing returns to the step S13, and the later processing is repeated. If it is determined in the step S17 that the counter value u exceeds 1.0, mapping processing in the lateral direction has reached the end of one line of the hair-style data array, so the processing goes to the step S19.

In the step S19, the mapping position calculation section 22 determines whether or not the counter value v exceeds 1.0. If the counter value v is determined as not exceeding 1.0, the processing go es to the step S20. In the step S20, the mapping position calculation section 22 increases the counter value v by an increment value dv. The increment value dv indicates how long pitch hair data stored in the hair-style data array is mapped in the longitudinal direction.

Thereafter, the processing returns to the step S12 and the later processing is repeated. In the step S19, if the counter value v is determined as exceeding 1.0, mapping processing is completed with respect to all lines. The hair mapping processing is terminated, and the processing goes to the step S5 shown in FIG. 3.

In the step S14, if the mapping flag of the triangle polygon including the mapping position obtained by the processing in the step S13 is negative, the triangle polygon is not determined to be a hair generation region, and the processing of the steps S15 and S16 is skipped.

By thus specifying a hair generation region with use of a mapping flag, mapping can be effected only on an arbitrary region of the three-dimensional model of the head part, without mapping all the hair data pieces that construct the hair-style data read out from the hair-style database 7. Therefore, a hair-style such as a so-called Machican cut, a star cut, or the like can be easily generated.

Also, according to this hair-style mapping processing, each of the hair-style data pieces stored in the hair-style database 7 is expressed by the object coordinate system of hair and can be mapped on a three-dimensional model of a head part having any arbitrary shape, without depending on the shape of the human head part.

Figure 11:
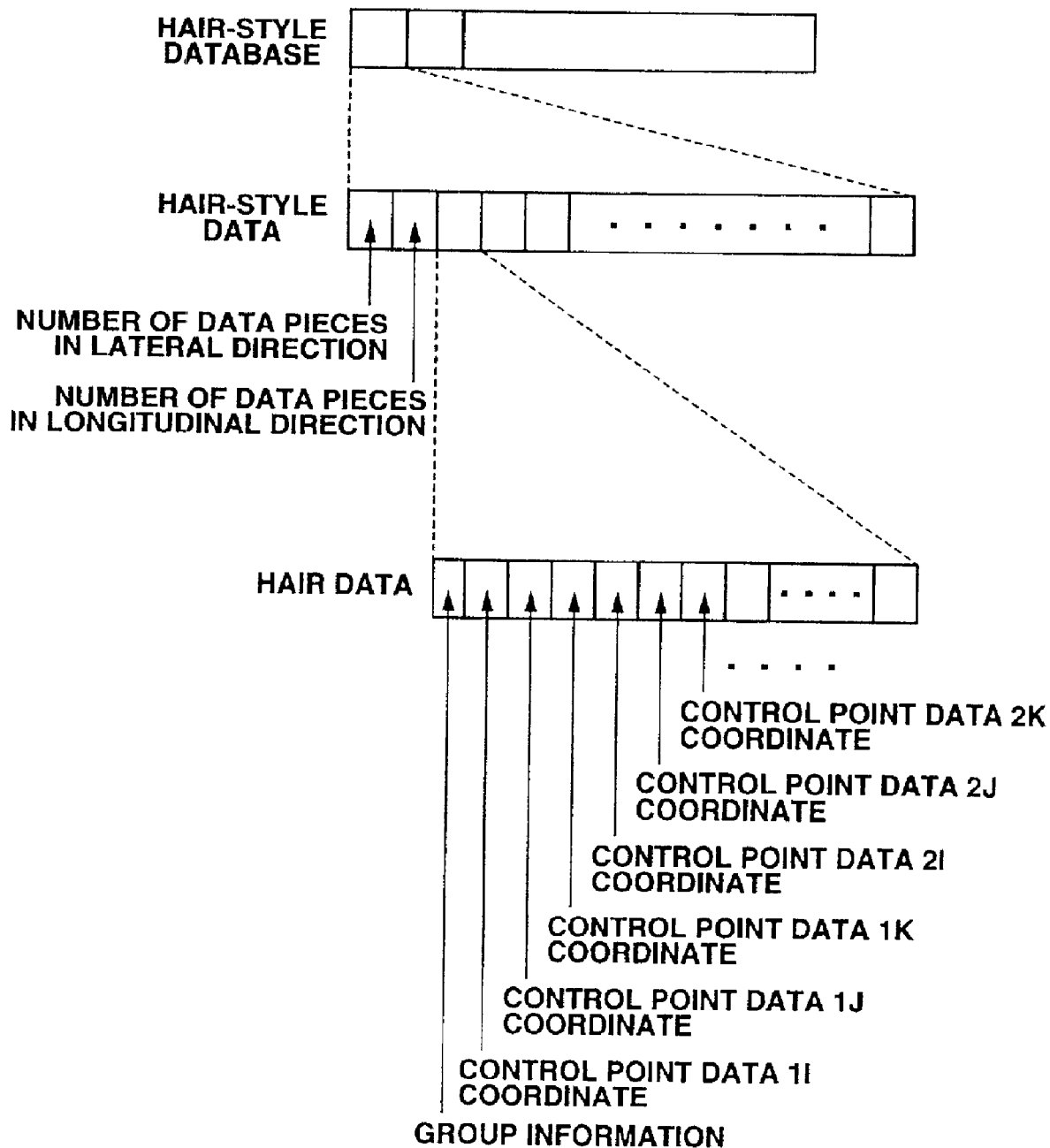
FIG. 11 is a view showing a data structure of the hair-style database shown in FIG. 1.

Next, the data structure of the hair-style database 7 will be explained with reference to FIG. 11. The hair-style database 7 is constructed by a number of hair-style data pieces. Each hair-style data piece is of a two-dimensional array as described above, and at the top, the number of data pieces $u_{max}$ in the lateral direction and the number of data pieces $v_{max}$ in the longitudinal direction. Following them, hair data pieces for ($u_{max} \times v_{max}$) are described.

In some cases, group information (described later) is described at the top of the hair data piece. Subsequently, a number of control point data pieces are described, in the case where hair data is approximated to a three-dimensional parametric curve or the like, the control point data pieces are expressed by the hair object coordinate system (I, J, K).

The hair data may be three-dimensional polygon data. In this case, a number of polygon vertex data pieces are described as hair data.

The group information described in the hair data can be used for hair data interpolation processing in the step S15 of the hair-style mapping processing (FIG. 6) described above.

Figure 12:
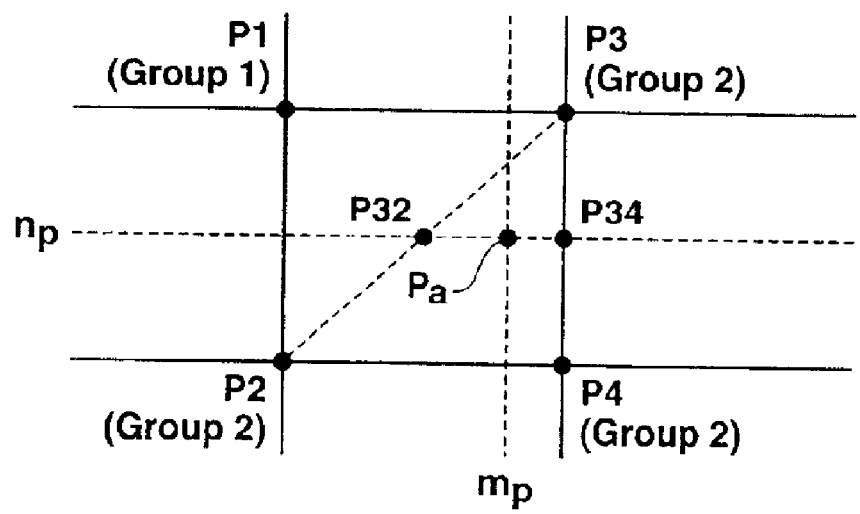
FIG. 12 is a view for explaining interpolation processing using group information included in hair data.

With reference to FIG. 12, explanation will be made of the hair data interpolation processing where group information is supplied. Where the counter value $u=u_p$ and the counter value $v=v_p$ are given, the address on the hair-style data array of hair data to be mapped is Pa=($m_p$, $n_p$) ($u_p$ $U_{max}$, $v_p$ $V_{max}$).

Suppose that the hair data at the point $P_a$ is Hp, four close points are points P1 to P4 as shown in FIG. 12, and hair data pieces at the points P1 to P4 are respectively H1 to H4. Further, 1 is described as group information in the hair data piece H1, and 2 is described as group information in each of the hair data pieces H2 to H4. That is, in this example, only the hair data piece H1 belongs to a group 1, and the other hair data pieces H2 to H4 belong to a group 2. If group information is given, only the hair data pieces that belong to one same group are used to perform interpolation, in the hair data interpolation processing.

More specifically, among the four close points of the point $P_a$ which is mapped at first, the closest point if obtained and the group information thereof is obtained. In case of FIG. 12, the closest point is the point P3. Next, among the four close points P1 to P4, the number of close points that belong to the same group as that of the closest point is obtained.

If no other point among the four close points P1 to P4 than the close point belongs to the same group as that of the closest point, the hair data piece of the closest point is directly used also for the point $P_a$.

If two close points including the closest point among the four close points P1 to P4 belong to the same group as that of the closest point, a linear interpolation value between the two points is used for interpolation.

If three close points including the closest point among the four close points P1 to P4 belong to the same group as that of the closest point, i.e., in the case shown in FIG. 12, an interpolation value is calculated by the next expression (7).

$Hp=(1-r) H32+r H34$ $H32=dn\ H2+(1-dn)\ H3$ $H34=dn\ H4+(1-dn)\ H3$ $r=(m_p-m32)/(m34-m32)$ (7)

In this expression, dn is the decimal part of $n_p$, m32 is the m-address at the point P32, and m34 is the m-address at the point P34.

By thus describing group information in hair data, for example, it is possible to express even a hair style having parting of hair where interpolation will cause a problem. That is, if grouping at the boundary of parting is performed, hair data pieces in both sides of the boundary can be used to prevent generation of unnatural hair, in case where four close points spread over the boundary.

Next, with reference to FIGS. 12 and 13, explanation will be made of an applicative example of the coordinate conversion in the processing in the step S16 in the hair-style mapping processing (FIG. 6) described above.

In the coordinate conversion processing in the step S16, unevenness in a hair style can be expressed with use of random numbers. FIG. 13A shows a state where unevenness in a hair style is not expressed while FIG. 13B shows an example of a state in which unevenness in a hair style is expressed by rotating the local coordinate system with use of a random number in the coordinate conversion.

Specifically, the local coordinate system (T, S, N) of the head part is rotated about an axis in correspondence with a generated random number where the axis is N. Thereafter, the result is converted into the object coordinate system (X, Y, Z) of the head part model. By this processing, the directions in which respective hairs grow can be changed delicately, without changing the positions where hair data should be mapped.

Figure 14A:
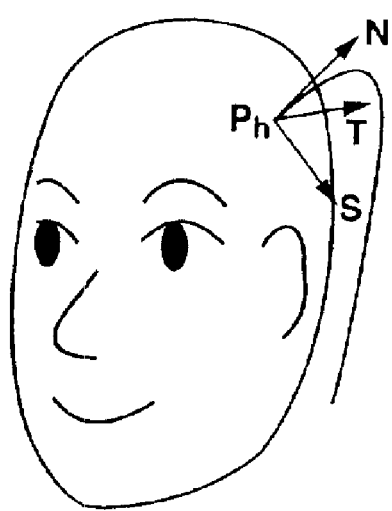
FIGS. 14A and 14B are views for explaining coordinate axis shift in coordinate conversion.
Figure 14B:
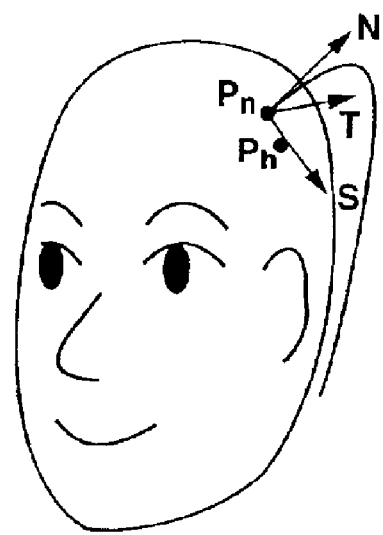

FIG. 14A shows a state in which unevenness in a hair style is not expressed, while FIG. 14B shows an example in which unevenness in a hair style is expressed by changing mapping positions by random numbers in the coordinate conversion.

Specifically, the position of $P_h$ as the origin of the local coordinate system (T, S, N) is shifted to $P_n$ in correspondence with a generated random number, and is thereafter converted into the object coordinate system (X, Y, Z) of the head part model. By this processing, the position where the hair grows can be changed delicately without changing the hair style.

The technique of rotating the axis of the coordinate system to be converted use the random number and/or moving its origin to express natural unevenness in a synthesized image can be applied to other cases than the synthesis of hair images.

Figure 15A:
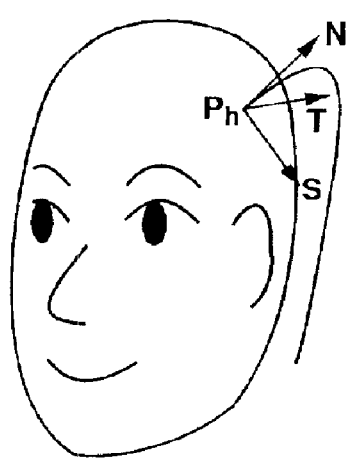
FIGS. 15A and 15B are views for explaining of mapping to the three-dimensional model of a head part with an arbitrary changed.

Meanwhile, in this hair synthesis system, hair-style data can be mapped after changing the three-dimensional model of the head part into an arbitrary shape by the three-dimensional head part reconstruction processing section 3. FIG. 15A shows a state in which the three-dimensional model of a head part is not changed, while FIG. 15B shows a state in which the three-dimensional model of the head part is magnified 1.5 times in the Y-axis direction.

Magnification/minification processing for a three-dimensional model of a head part is achieved by affine conversion processing. At this time, similar affine conversion processing is performed also on the local coordinate system (T, S, N) assigned to an arbitrary polygon vertex of the three-dimensional model of a head part.

Figure 15B:
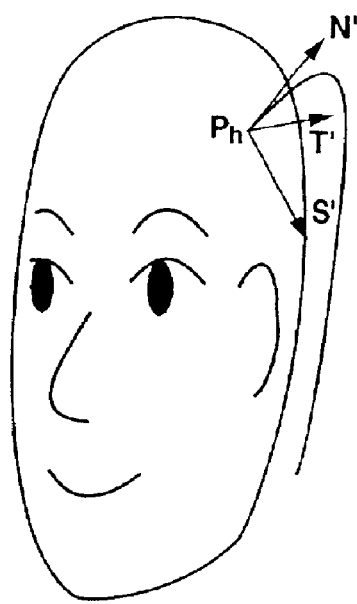
Figure 16:
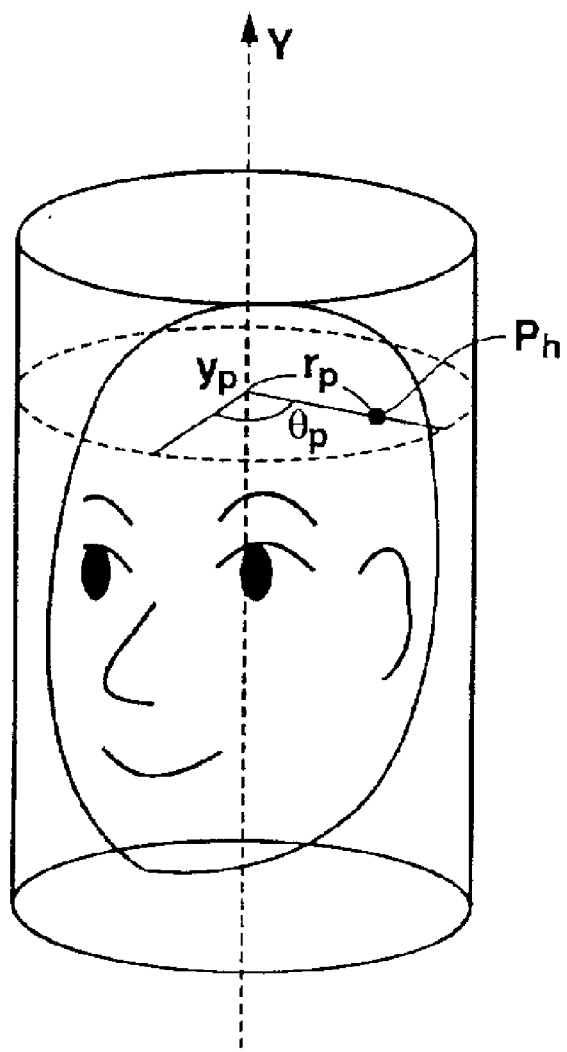
FIG. 16 is a view showing a columnar coordinate system when hair-style data is generated.

As shown in FIG. 15B, in the case of magnifying the three-dimensional model of the head part for 1.5 times in the Y-axis direction, vectors of T, S, and N are multiplied by a conversion matrix for 1.5 times magnification in the Y-axis direction, to obtain a local coordinate system (T', S', N') expanded in the longitudinal direction. By mapping hair data H on the local coordinate system (T', S', N') thus deformed, the hair style is magnified 1.5 times in the Y-axis direction, into a shape matched with the head part. By this processing, same hair-style data can be mapped on the three-dimensional model of a head part, which is deformed into an arbitrary shape. Next, generation of hair-style data will be explained with reference to FIG. 16. FIG. 16 shows a columnar coordinate system which surrounds a head part. In the columnar coordinate system, the axis penetrating the center of a column is taken as the Y-axis, the distance from the Y-axis to a plane perpendicular to the Y-axis is r, and the angle from a reference direction on this plane is θ.

An arbitrary point $P_h$ on the surface of the head part can be expressed as $P_h=(y_p, r_{pd\ p})$ with use of the columnar coordinate system. Further, if the line defined by $Y=y_p$ and $θ=θ_p$ of the columnar coordinate system always has one contact point with the surface of the head part, the arbitrary point $P_h$ on the surface of the head part can be expressed by $(y_p, θ_p)$.

That is, if the shape of the surface of the head part is always convex toward the circumferential direction, the above condition (the line defined by $Y=y_p$ and $θ=θ_p$ of the columnar coordinate system always has one contact point with the surface of the head part) is satisfied.

Considering the scalp part excluding the face, the shape of the surface of the head part is generally considered to be always convex toward the circumferential direction. Therefore, the arbitrary point Ph on the scalp part of the head-part model can be expressed by $P_h=(y_p, θ_p)$.

Creation of hair-style data can be relatively easily carried out by using a system disclosed in "Development of a hair design system using tuft models" by Kishi, Saegusa, and Morishima, in Shingakugihou, MVE97-102, pp. 67–74, 1998. In the system, hair-style data is prepared by editing hair data generated on a given head-part model. Hair data outputted from this system is expressed by the object coordinate system of the given head-part model.

The hair database 7 in the present invention records hair-style data which is stored in a two-dimensional array by mapping the hair data on a space expressed by (y,θ) of a columnar coordinate system. For example, the following expression (8) is used for conversion from the (y, θ) space into the (u, v) space of the two-dimensional array as shown in FIG. 7.

$$u=θp/2π$$
$$v=(y_p-y_{min})/(Y_{max}-y_{min}) \qquad (8)$$

In this expression, $y_{min}$ is the smallest value of the Y-axis of the columnar coordinate system of the surface of the head part, and $y_{max}$ is the largest value of the Y-axis of the columnar coordinate system of the surface of the head part.

The conversion from the (y,θ) space into the (u, v) space may be of non-linear. For example, sampling near the top part of the head can be prevented from being coarse, as long as the conversion is arranged such that the increment in the v-direction becomes smaller as it comes closer to the head top.

As described above, hair-style data consisting of hair data converted into the (u, v) space is recorded in the hair-style database 7.

The present invention is also applicable to the case of expressing a string-like object other than hair in CG.

The series of processing in the image processing apparatus 2 as described above can be executed by both hardware and software. In case of executing the series of processing by software, the software can be installed from a recording medium into a computer in which the program constituting the software is incorporated in dedicated hardware or a general-purpose computer which can execute various functions computer by installing various programs.

Figure 17:
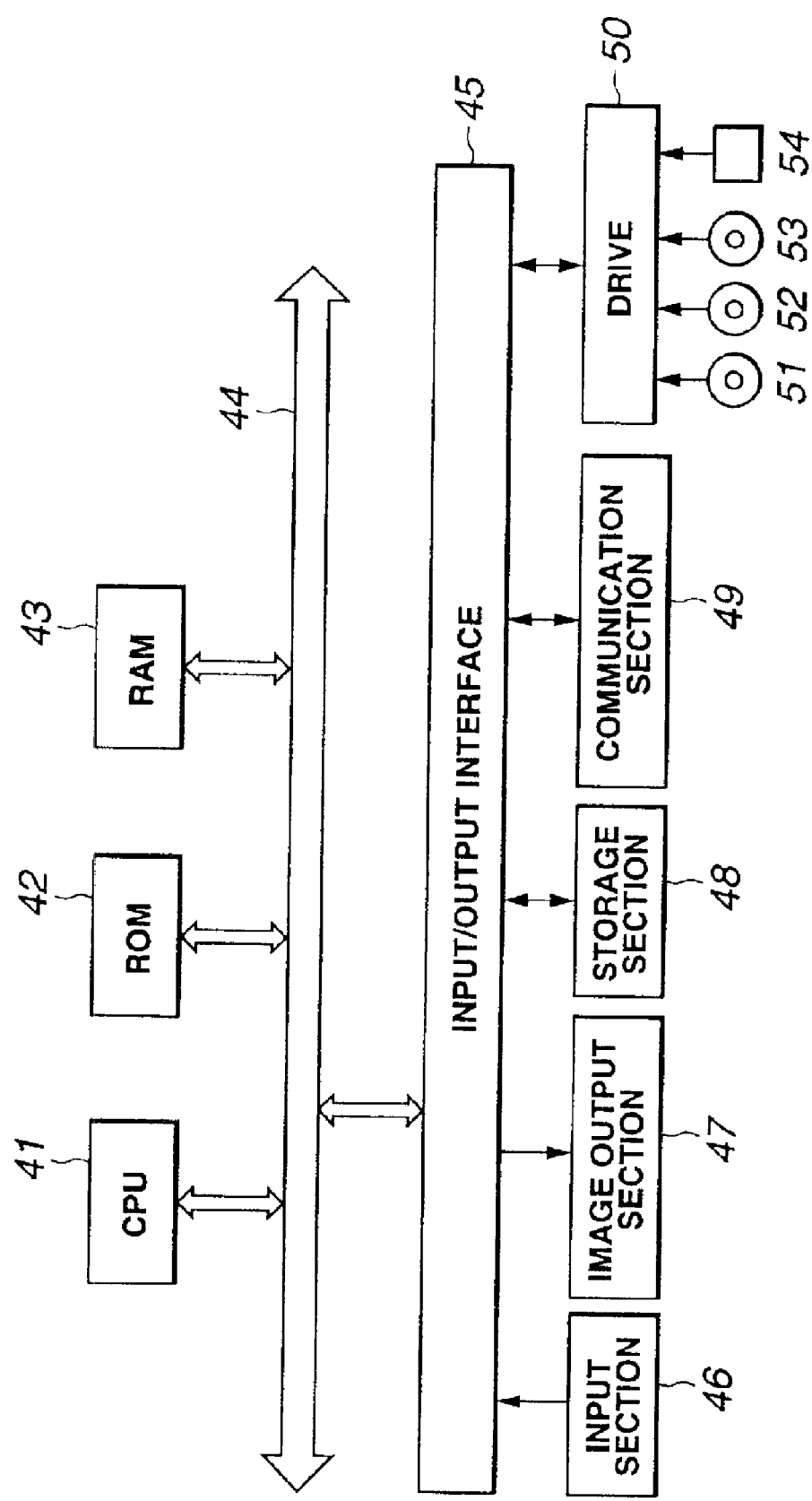
FIG. 17 is a view showing a structural example of a personal computer which realizes an image processing apparatus.

FIG. 17 shows a structural example of a personal computer which embodies the image processing apparatus 2. This personal computer includes a CPU (Central Processing Unit) 41. The CPU 41 is connected with an input/output interface 45 through a bus 44. The input/output interface 45 is connected with: an input section 46 constructed by an input device such as a keyboard, a mouse, or the like; an image output section 47 for outputting a hair-style-matched image to the display device 9; a storage section 48 constructed by a hard-disc drive for storing a program, various data, and the like; a communication section 49 for communicating data through Internet or the like; and a drive 50 for reading/writing data with respect to a recording medium such as a magnetic disc 51, a semiconductor memory 54, or the like. The bus 44 is connected with a ROM (Read Only Memory) 42 and a RAM (Random Access Memory) 43.

An image processing program which lets the personal computer execute operation as the image processing apparatus 2 is supplied in the form that it is stored in the magnetic disc 51 or semiconductor memory 54, to the personal computer. It is read by the drive 50 and installed in the hard disc drive included in the storage section 48. The image processing program installed in the storage section 48 is loaded from the storage section 48 to the RAM 43 and executed, in accordance with instructions from the CPU 41 corresponding to commands from the user.

In the present invention, the step of describing the program recorded in the recording medium includes not only processing which is carried out based on time in accordance with a described order but also processing which is executed in parallel or individually although it is not always performed based on time.

Also, in the present invention, the term of "system" includes the entire apparatus constructed of a number of apparatuses and/or devices.

Industrial Applicability

As described above, according to the present invention, the hair-style is stored, stored hair-style data: is read out, and hair data corresponding to a hair and included in the hair-style data is mapped at a predetermined position of a three-dimensional shape image of a head part. Therefore, a hair style consisting of hairs which are expressed by CG can be changed so as to correspond to a number of different head shapes. Also, according to the present invention, stored hair-style data is read out, and hair data corresponding to a hair and included in the read out hair-style data is mapped at a predetermined position on a three-dimensional shape image of a head part. Based on the mapping results, a hair-style-matched image is generated. Therefore, a hair style consisting of hairs which are expressed by CG can be changed so as to correspond to a number of different head shapes.

Although the present invention has been described with reference to specific embodiments, those of skill in the art will recognize that changes may be made thereto without departing from the spirit and scope of the invention as set forth in the hereafter appended claims.

What is claimed is:

1. An image processing apparatus for synthesizing a hair image with a three-dimensional shape image of a head part, to generate a hair-style-matched image, comprising:
   a storage part for storing a hair-style data piece constructed by a plurality of hair data pieces arranged on a two-dimensional array, wherein the storage part stores the hair-style data piece constructed with a plurality of data pieces arranged on a two-dimensional array corresponding to a projected image obtained by projecting a three-dimensional hair style expressed by a columnar coordinate system on a two-dimensional coordinate system;
   a read out part for reading out the hair-style data piece stored in the storage part;
   a mapping part for mapping the hair data piece corresponding to a hair contained in the hair-style data piece read out by the read out part, at a predetermined position on the three-dimensional shape image of the head part; and
   a generation part for generating the hair-style-matched image, based on a mapping result obtained by the mapping part.

2. The image processing apparatus according to claim 1, wherein the hair data piece is three-dimensional curve data which is constructed by a plurality of control points.

3. The image processing apparatus according to claim 1, wherein the hair data piece is polygon data which is constructed by a plurality of polygons.

4. The image processing apparatus according to claim 1, wherein an interpolation part interpolates the hair data piece at the predetermined position with use of a hair data piece close to the predetermined position.

5. The image processing apparatus according to claim 4, wherein the interpolation part interpolates the hair data piece based on group information contained in the hair data piece close to the predetermined position.

6. The image processing apparatus according to claim 1, wherein the mapping part includes a coordinate conversion part for converting the hair data piece expressed by a first coordinate system into data of a second coordinate system by which the three-dimensional shape image of the head part is expressed.

7. The image processing apparatus according to claim 6, wherein the coordinate conversion part converts the hair data piece expressed by the first coordinate system into data of a local coordinate system having an origin on a surface of the head part, and thereafter converts the data into data of the second coordinate system by which the three-dimensional shape image of the head part is expressed.

8. The image processing apparatus according to claim 6, wherein when the hair data piece expressed by the first coordinate system is converted into the data of the second coordinate system by which the three-dimensional shape image of the head part is expressed, the coordinate conversion part executes at least one of a coordinate axis rotation and origin shift, based on a random number.

9. An image processing method for synthesizing a hair image with a three-dimensional shape image of a head part, to generate a hair-style-matched image, the method comprising the steps of:
   storing a hair-style data piece constructed by a plurality of hair data pieces arranged on a two-dimensional array;
   reading out the hair-style data piece;
   mapping the hair data piece corresponding to a hair contained in the read out hair-style data piece at a predetermined position on the three-dimensional shape image of the head part; and
   generating the hair-style-matched image based on the mapping result, wherein during the step of storing, the hair-style data piece is constructed by a plurality of hair data pieces arranged on a two-dimensional array corresponding to a projected image obtained by protecting a three-dimensional hair style expressed by a columnar coordinate system, on a two-dimensional coordinate system.

10. The image processing method according to claim 9, wherein the hair data piece is three-dimensional curve data which is constructed by a plurality of control points.

11. The image processing method according to claim 9, wherein the hair data piece is polygon data which is constructed by a plurality of polygons.

12. The image processing method according to claim 9, further comprising the step of interpolating the hair data piece at the predetermined position with use of a hair data piece close to the predetermined position.

13. The image processing method according to claim 12, wherein during the step of interpolating, the hair data piece is interpolated based on group information contained in the hair data piece close to the predetermined position.

14. The image processing method according to claim 9, wherein the step of mapping includes a coordinate conversion step of converting the hair data piece expressed by a first coordinate system into data of a second coordinate system by which the three-dimensional shape image of the head part is expressed.

15. The image processing method according to claim 14, wherein the coordinate conversion step includes converting the hair data piece expressed by the first coordinate system into data of a local coordinate system having an origin on a surface of the head part, and thereafter, converting the data into data of the second coordinate system by which the three-dimensional shape image of the head part is expressed.

16. The image processing method according to claim 14, wherein the step of converting the hair data piece expressed by the first coordinate system into the data of the second coordinate system by which the three-dimensional shape image of the head part is expressed includes executing at least one of coordinate axis rotation and origin shift based on a random number, in processing in the coordinate conversion step.

17. A recording medium which records a computer-readable program for image processing of synthesizing a hair image with a three-dimensional shape image of a head part, to generate a hair-style-matched image, the program comprising:

a storage part for of storing a hair-style data piece constructed by a plurality of hair data pieces arranged on a two-dimensional array;

a read out part for of reading out the hair-style data piece stored by processing in the storage part;

a mapping part for of mapping the hair data piece corresponding to a hair contained in the hair-style data piece read out by the read out part, at a predetermined position on the three-dimensional shape image of the head part; and a generation part for of generating the hair-style-matched image, based on a mapping result obtained by the mapping part, wherein, during processing in the storage part, the hair-style data piece constructed with a plurality of data pieces arranged on a two-dimensional array corresponding to a projected image obtained by projecting a three-dimensional hair style expressed by a columnar coordinate system, on a two-dimensional coordinate system.

18. The recording medium according to claim 17, wherein the hair data piece is three-dimensional curve data which is constructed by a plurality of control points.

19. The recording medium according to claim 17, wherein the hair data piece is polygon data which is constructed by a plurality of polygons.

20. The recording medium according to claim 17, wherein the program further comprises an interpolation part for of interpolating the hair data piece at the predetermined position with use of a hair data piece close to the predetermined position.

21. The recording medium according to claim 20, wherein, during processing in the interpolation part, the hair data piece is interpolated based on group information contained in the hair data piece close to the predetermined position.

22. The recording medium according to claim 17, wherein, processing in the mapping part includes a coordinate conversion step of converting the hair data piece expressed by a first coordinate system into data of a second coordinate system by which the three-dimensional shape image of the head part is expressed.

23. The recording medium according to claim 22, wherein, during processing in the coordinate conversion part, the hair data piece expressed by the first coordinate system is converted into data of a local coordinate system having an origin on a surface of the head part, and thereafter, the data is converted into data of the second coordinate system by which the three-dimensional shape image of the head part is expressed.

24. The recording medium according to claim 22, wherein, when the hair data piece expressed by the first coordinate system is converted into the data of the second coordinate system by which the three-dimensional shape image of the head part is expressed, at least one of coordinate axis rotation and origin shift is executed, based on a random number, during processing in the coordinate conversion part.

* * * * *